United States Patent Office 3,546,464
Patented Dec. 8, 1970

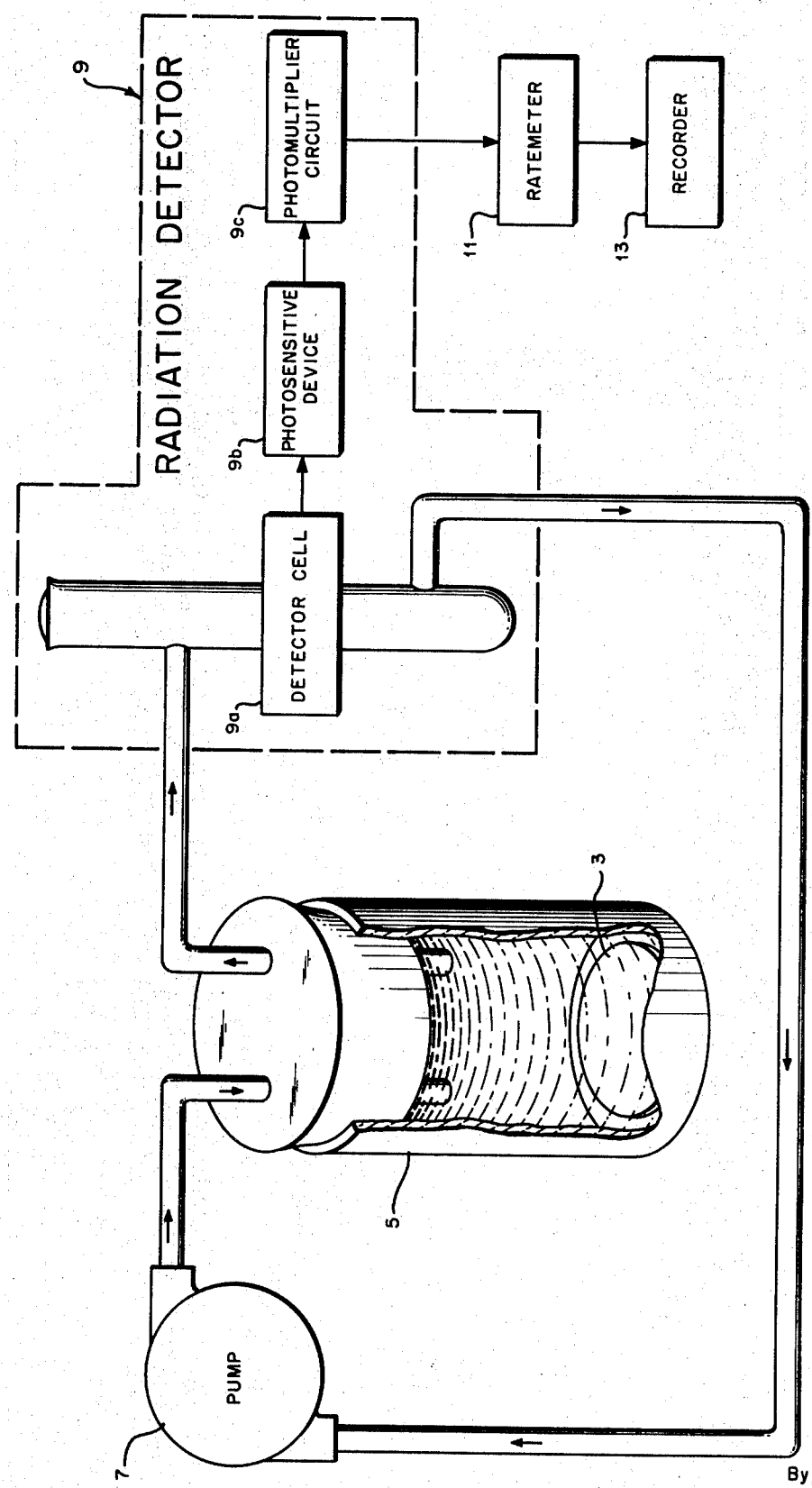

3,546,464
RADIOACTIVE PROCESS FOR MONITORING THE RATE OF DEPOSITION OR REMOVAL OF A SUBSTANCE ON A BASE SURFACE
Alfred L. Glass, Philadelphia, Pa., assignor to the United States of America as represented by the Secretary of the Navy
Filed Apr. 23, 1968, Ser. No. 723,482
Int. Cl. G01t 1/17
U.S. Cl. 250—106  1 Claim

ABSTRACT OF THE DISCLOSURE

The present invention relates to a novel and improved procedure for continuously monitoring the rate at which a material or composition is deposited on or removed from a base surface. The procedure involves the use of a radioactive isotope as one of the ingredients of the material or composition and the maintenance of a continuous record of the concentration of the radioactive isotope in the fluid environment in which the material or composition is exposed.

---

The invention described herein may be manufactured and used by or for the Government of the United States of America for governmental purposes without the payment of any royalties thereon or therefor.

Various types of research programs often require the study of the transfer of a material or composition between a particular surface and its surrounding fluid environment. Extensive programs of research, for example, into the nature of the formation of films and the manner in which they provide protection of a base metal against corrosion have been in progress for some time. The effectiveness of films of this kind is often dependent upon the degree of their solubility or suspendability in the fluid environment in which they are immersed. Although various procedures and techniques have been devised and used in the past to study and evaluate the effectiveness and character of protective films or coatings of this kind, considerable difficulty has been experienced heretofore in providing a process in which the evaluation or analysis can be performed with a high degree of reliability, accuracy and sensitivity.

It is therefore a principal object of this invention to provide a novel and improved procedure for continuously monitoring the rate at which a material or composition goes into or out of solution or suspension in the fluid environment in which it is immersed.

It is a further object of the invention to provide a novel and improved procedure for determining with high reliability, accuracy and sensitivity the effectiveness of a cleaning compound, a paint stripping composition, a corrosion preventative material or any material which depends on its solubility and/or the suspendability in the surrounding fluid environment.

It is a further object of the invention to provide a novel and improved procedure for evaluating the effectiveness of a chemical conversion coating as a corrosion preventative on an aluminum or other metal base surface.

Other objects and many of the attendant advantages of this invention will be readily appreciated as the same becomes better understood by reference to the following detailed description when considered in connection with the accompanying drawing wherein:

The figure is a diagrammatic view of a preferred embodiment of the apparatus used in the invention in the manner in which is might be used to evaluate the leaching rate of chromium from a chemically chromated aluminum base surface.

In general, in carrying out the improved process of the present invention, the material or composition which is to be analyzed is formulated by using a radioactive isotope for one of its ingredients. The radioactivated material is then immersed in a simulated environmental liquid or fluid medium which is continuously circulated through the well of a scintillation detector counter. Counts of the detector are then converted directly to units by weight of the radioactive material dissolved into or removed from the circulating medium in a conventional ratemeter. Recording apparatus coupled to the output of the ratemeter provides a continuous record of the concentration of the radioactive material circulating through the fluid medium.

Details of the improved process of the invention are described herein in the manner in which it might be used to evaluate the leaching rate of chromium from a chemically chromated aluminum base surface. It is to be understood, however, that the process can also be used to perform many different studies and evaluations including the effectiveness of cleaning materials, carbon removers, paint strippers, corrosion preventative compounds, chemically treated coatings or any material, the principal action of which is dependent on its solubility or suspension or its removal from an environmental fluid without departing from the spirit or scope of the invention.

In order to study or evaluate the effectiveness of a chemically chromated composition as a protective coating in a simulated sea water environment in accordance with the improved procedure of the invention, the protective coating composition containing all of its regular ingredients with the exception of chromic acid is first prepared. Chromic acid containing the radioactive isotope chromium-51 is then admixed with the compound to obtain a radioactive embodiment of the protective coating composition that is conventionally used to precoat aluminum metal surfaces on naval aircraft. An aluminum alloy disk 3 which is pretreated with a suitable aluminum brightener compound is then taped on one side and immersed in the radioactivated chromating solution for a predetermined time period. The chromated disk is then thoroughly washed and air dried. The tape is then removed from the disk and the disk is placed with its chromated surface up in the test cell 5 as shown in the figure of the drawing. A .2 normal solution of sodium chloride or a suitable synthetic sea water solution is then circulated by the fluid pump 7 through the test cell 5 and the scintillation detector cell 9a of the radiation detector 9. Flashes of light produced by gamma ray emission through the scintillation detector are converted into bursts of electrical current by a photo-sensitive device 9b and a photomultiplier circuit 9c in the detector 9. The bursts of current are then further amplified and converted to counts per minute by the ratemeter 11 and continuously recorded directly in grams of chromium by the recorder 13. The recorder 13 in addition to converting the counts per minute from ratemeter 11 directly to grams of chromium also applies suitable corrections for background noise and loss of activity due to the decay rate of the chromium-51. Counts per minute from the ratemeter 11 are converted to grams of chromium in the recorder by preliminarily calibrating the recorder with various known amounts of chrominum-51 prior to the actual tests to evaluate the chromimum leaching rate from the chromated aluminum surface.

Obviously, many modifications and variations of the present invention are possible in the light of the above teachings. It is therefore to be understood that within the scope of the appended claim, the invention may be practiced otherwise than as specifically described.

What is claimed is:
1. The method of analyzing the transfer of a protective chromate coating from an aluminum alloy surface into a simulated sea water environment, said method comprising the steps of:
(a) preparing a composition containing all the ingredients of the chromate coating other than of chromic acid;
(b) admixing chromic acid containing the radioactive isotope chromium-51 with the said composition;
(c) treating the aluminum surface with a brightener compound;
(d) applying the radioactivated chromate coating to the aluminum surface;
(e) placing the coated aluminum surface in a test cell;
(f) circulating the simulated sea water environment through the test cell and through the well of a scintillation detector cell;
(g) detecting radiation in the sea water environment;
(h) and recording the detected radiation in a precalibrated recorder such that transfer of the chromate coating into the sea water environment is measured directly in units of weight of the coating.

References Cited

UNITED STATES PATENTS

| | | | |
|---|---|---|---|
| 3,242,338 | 3/1966 | Danforth et al. | 250—106T |
| 3,348,052 | 10/1967 | Raifsnider et al. | 250—43.5R |

RALPH G. NILSON, Primary Examiner

M. J. FROME, Assistant Examiner